(12) United States Patent
Bellon

(10) Patent No.: US 9,555,851 B2
(45) Date of Patent: Jan. 31, 2017

(54) SCOOTER WITH ROTATABLE PLATFORM

(76) Inventor: Michael Bellon, San Diego, CA (US)

( * ) Notice: Subject to any disclaimer, the term of this patent is extended or adjusted under 35 U.S.C. 154(b) by 0 days.

(21) Appl. No.: 13/521,689

(22) PCT Filed: Jan. 11, 2011

(86) PCT No.: PCT/US2011/020897
§ 371 (c)(1),
(2), (4) Date: Jul. 11, 2012

(87) PCT Pub. No.: WO2011/085404
PCT Pub. Date: Jul. 14, 2011

(65) Prior Publication Data
US 2012/0326408 A1    Dec. 27, 2012

Related U.S. Application Data

(60) Provisional application No. 61/293,774, filed on Jan. 11, 2010.

(51) Int. Cl.
| | |
|---|---|
| *B62M 1/00* | (2010.01) |
| *B62K 13/00* | (2006.01) |
| *B62B 17/06* | (2006.01) |
| *B62B 19/04* | (2006.01) |
| *B62K 3/00* | (2006.01) |
| *B62K 17/00* | (2006.01) |

(52) U.S. Cl.
CPC .............. *B62K 13/00* (2013.01); *B62B 17/065* (2013.01); *B62B 19/04* (2013.01); *B62K 3/002* (2013.01); *B62K 17/00* (2013.01)

(58) Field of Classification Search
CPC ....... A63C 17/01; A63C 17/06; A63C 17/004; A63C 17/011; A63C 17/013; A63C 17/265; A63C 17/0006; B62K 3/002; B62J 9/02; B62M 1/00
USPC ................ 280/7.14, 87.01, 87.021, 87.03, 280/87.041–87.043, 87.05
See application file for complete search history.

(56) References Cited

U.S. PATENT DOCUMENTS

| | | | | |
|---|---|---|---|---|
| 4,133,548 | A * | 1/1979 | Smith | 280/87.041 |
| 5,354,081 | A * | 10/1994 | Huffman et al. | 280/87.01 |
| D365,377 | S * | 12/1995 | Chen | D21/765 |
| 5,816,592 | A * | 10/1998 | Horton et al. | 280/87.041 |
| 5,927,734 | A * | 7/1999 | Horton et al. | 280/87.042 |
| D446,260 | S * | 8/2001 | Bang | D21/423 |
| 6,367,828 | B1* | 4/2002 | Mandic | 280/87.05 |
| 6,386,562 | B1* | 5/2002 | Kuo | 280/87.042 |
| 6,406,042 | B1* | 6/2002 | Tsai | 280/87.041 |
| 6,644,672 | B2* | 11/2003 | Desjardins et al. | 280/7.13 |
| 6,685,201 | B1* | 2/2004 | Smith, III | 280/87.01 |
| 6,805,368 | B1* | 10/2004 | Chen | 280/87.041 |
| 7,083,177 | B1* | 8/2006 | Chen | 280/87.041 |
| D529,565 | S * | 10/2006 | Warner et al. | D21/765 |

(Continued)

*Primary Examiner* — J. Allen Shriver, II
*Assistant Examiner* — Travis Coolman
(74) *Attorney, Agent, or Firm* — Gordon Rees Scully Mansukhani LLP; Kathryn K. Hull; David R. Heckadon

(57) ABSTRACT

A scooter having a riding platform rotationally engaged to a front steering assembly is provided which significantly increases the ability of riders to perform tricks. The riding platform is rotationally engaged to the steering column which itself may be employed as a riding platform. An optional mechanism may be employed whereby the riding platform is rotated by a spin of the steering column with the handlebars. The scooter may also be equipped with skids to allow employment in the snow or on ice.

7 Claims, 5 Drawing Sheets

(56) References Cited

U.S. PATENT DOCUMENTS

| | | | |
|---|---|---|---|
| 7,213,823 B1* | 5/2007 | Vujtech | 280/87.021 |
| 7,226,081 B2* | 6/2007 | Chen | 280/771 |
| 2006/0192358 A1* | 8/2006 | Chen | 280/93.512 |
| 2008/0197594 A1* | 8/2008 | Ling | 280/87.041 |
| 2010/0059955 A1* | 3/2010 | Steinbach | 280/87.041 |
| 2012/0018968 A1* | 1/2012 | Joslin et al. | 280/87.041 |
| 2012/0104714 A1* | 5/2012 | Sapir | 280/87.05 |

* cited by examiner

SCOOTER WITH ROTATABLE PLATFORM

This application claims priority to U.S. Provisional Application No. 61/293,774, filed Jan. 11, 2010, which is included herein in its entity by reference.

BACKGROUND OF THE INVENTION

1. Field of the Invention

The present invention relates to scooters. More particularly it relates to a scooter having a rotatable platform for performing extreme maneuvers.

2. Prior Art

Conventionally, a skateboard scooter consists of a board or platform with front and rear wheels, also with a steering column and handlebars mounted on the front wheel assembly. The front wheel assembly with steering column is often made foldable for easy storage and carrying. Many variations and additions have been made to this basic design and are seen widely in prior art.

U.S. Pat. No. 6,270,095 to Chang teaches a foldable skateboard scooter more commonly known as a RAZOR Scooter. This patent is arguably the most commonly known style of skateboard configured scooter employing a lightweight structure, friction breaks, and adjustable steering column just to name a few.

However, one may question the title of a 'skateboard' scooter when in fact the patent and many other skateboard scooters in prior art cannot mimic many of the maneuvers of an actual skateboard such as the 'kickflip' which is a maneuver requiring a rotation of the board or platform wherein the user rotates the platform, about its longitudinal axis.

As such, there is a continuing and unmet need for a skateboard style scooter which is configured to allow for rotation of the platform and includes other components that configure the scooter to be able to attempt to perform the maneuvers commonly achieved on a skateboard as well as perform never before seen stunts.

SUMMARY OF THE INVENTION

The device herein disclosed and described provides a skateboard scooter comprised of a riding platform with front and rear ends, front and rear wheel assemblies, and steering assembly. The rear wheel assembly is engaged to the rear end of the riding platform defining as a whole the rear wheel assembly. The steering assembly, including steering bar and wheel, is engaged to the front of the base of the scooter, thereby forming as a whole the front wheel assembly.

In a particularly preferred mode the steering assembly consists of a steering column, with top and bottom end with the bottom end engaged to the front wheel assembly and the top end slidably engaged to the bottom end for selective height adjustment. The steering assembly also includes a steering bar or handlebars at the top end. In one disclosed mode of the device herein, the distal ends of the handle bars have a rotatably engaged wheel assembly engaged to the center and distal ends of the handle bars.

This provision of handlebar engaged wheel assemblies provides the possibility of new and never before seen maneuvers to be performed. With the new wheel assemblies engaged on the handlebars as described a user can now flip the scooter 90 degrees where the front wheel assembly and handle bar wheel assemblies engaged the ground allowing the user to ride the steering column as a temporary platform. Maneuvers can be performed by like switching back and forth between conventional riding and riding the steering assembly as described, which has never been done before.

The front wheel assembly and rear wheel assembly are rotatably engaged by a means of rotatable engagement between the front end of the riding platform and bottom end of the steering assembly. The rear wheel assembly is also rotatably engaged to the riding platform. This rotatable engagement provides the user a means to rotate the rear wheel assembly (riding platform and rear wheel) about its longitudinal axis mimicking the 'kickflip' motion of a skateboard.

Similarly, the rotatable engagement means of the front wheel assembly and the riding platform also allows the front wheel assembly to rotate freely about a longitudinal axis perpendicular to the riding platform. This front assembly engagement allows a user to simultaneously rotate the front wheel assembly (handlebars, steering column, and front wheel) freely in a 360 degree motion, while rotating the rear wheel assembly (riding platform and rear wheel assembly) freely in a 360 degree fashion and any combination therein.

Further, in manner similar to rotating the front wheel assembly about its longitudinal axis as just described, the rear wheel assembly as a whole can be rotated about the longitudinal axis of the front wheel assembly while the front wheel assembly remains stationary. This motion along with the 'kickflip' motion achieved creates even more possibilities in extreme maneuvers by allowing the rear wheel assembly to rotate or 'whip' around the axis of the front wheel assembly while simultaneously 'flipping' about its own longitudinal axis. These motions may also be accomplished mechanically. For example, as the front wheel and steering assembly are spun about in a 360 degree motion, a mechanical means may be actuated and performs the platform rotation simultaneously as described.

For stopping the device, the device employs the provision of a friction brake located at the rear of the riding platform. The user simply steps on an extended partition that actuates a friction braking mechanism against the rear wheel. Of course other means for breaking as would occur to those skilled in the art are anticipated and are considered included herein.

In another particularly preferred mode of the device, the front and rear wheel assemblies may instead be in the form of a ski, sled, or similar hydroplaning platform rather than employing wheels. This mode, replacing a rotating riding component with a sliding component, allows the device to be ridden in the snow or when towed behind a water vessel.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide a scooter with a rotating riding platform.

It is another object of the invention to provide a skateboard style kick scooter that allows for a myriad of new and never before seen maneuvers.

It is still an object of the current invention to provide a means to mimic skateboard style stunts through the provision of a rotatable riding platform.

A further object of the invention is the provision of handlebar mounted wheel assemblies providing a means to ride the steering column as a riding platform.

A still further object of the invention is the provision of a means to mechanically flip the riding platform as the handlebars are simultaneously spun around in a 360 degree manner.

Yet another object of the invention is the provision of skis or similar hydroplaning sled at the wheel assemblies for use in snow or water.

BRIEF DESCRIPTION OF DRAWING FIGURES

DETAILED DESCRIPTION OF THE
PREFERRED EMBODIMENTS OF THE
INVENTION

Figure 1:
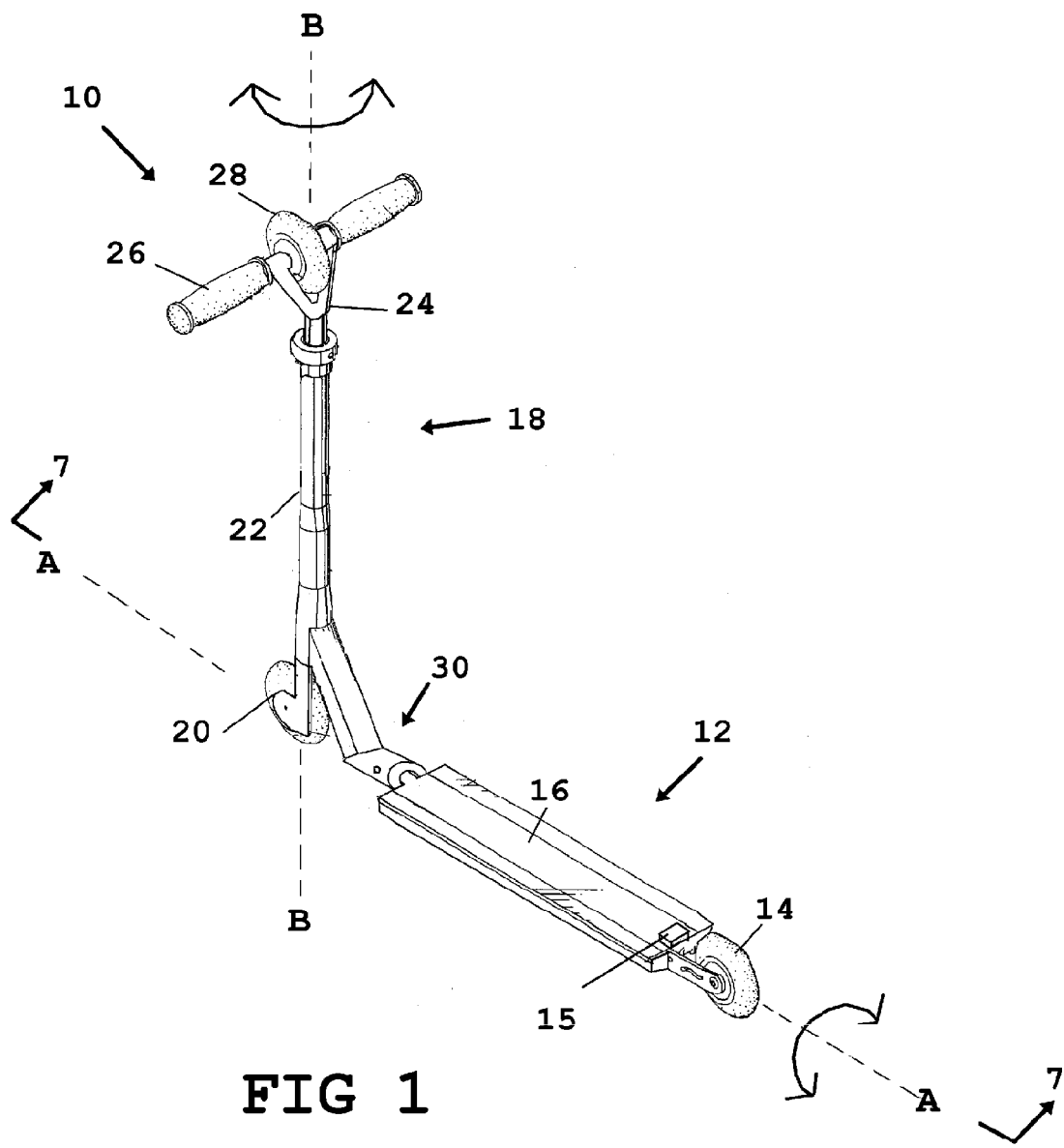
FIG. 1 shows a perspective view of a particularly preferred mode of the device.

Now referring to drawings in FIGS. 1-8, wherein similar components are identified by like reference numerals, there is seen in FIG. 1 a perspective view of the preferred embodiment of the device 10. As shown, the device 10 generally includes a rear wheel assembly 12 and front wheel assembly 18 both being respectively engaged to the platform 16 with the front wheel assembly 18 being engaged to the platform by a rotational engagement means 30. All components of the device are generally light weight material such as aluminum or alloy composing the former so as to minimize the weight and maximize potential performance for tricks and riding.

The rear wheel assembly 12 includes an in-line rear wheel 14 and a riding platform 16. The front wheel assembly 18 includes an in-line front wheel 20, bottom end of the steering column 22, and top end of the steering column 24. The top end 24 is defined by the handlebars 26 and optionally centrally engaged additional wheel 28 for the device 10 with the most trick and riding ability. The additional wheel 28 allows a user riding the device in a as-used position, to flip the device 10 to place the riding platform 16 perpendicular to the riding surface, and to ride the steering column 22, 24 as temporary riding platform as desired for performing stunts and extreme maneuvers never before seen in conventional skateboard scooters. A small platform similar to the riding platform 16 may be engaged to the steering column 22 for easier balance thereon. Furthermore, the bottom end of the steering column 22 opposite the top end 24 are slidably engaged to each other as a telescopic means to selectively position the handlebars 26 at the desired height.

In use, the rotational engagement means 30 such as conventional bearing riding inside of a race, or an axle engaged to a rotating center of a bearing, permits the rear wheel assembly 12 to rotate about its' longitudinal axis A-A and concurrently allows the front wheel assembly 18 to rotate about the perpendicular axis B-B. A plurality of stunts and extreme maneuvers by a rider standing on the device 10 in an as-used position, can be performed given the multitude of combinations of rotation of the various components made possible by the device 10.

Figure 2:
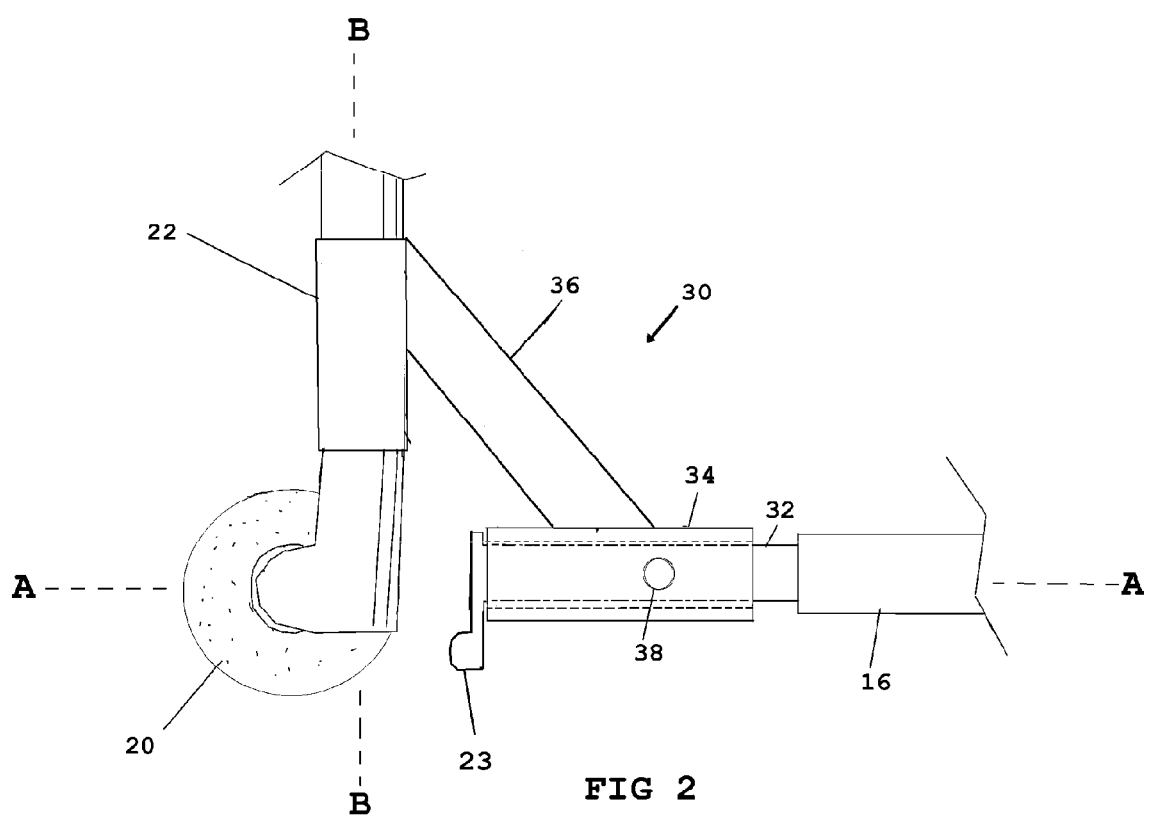
FIG. 2 is a side detailed view of the rotational engagement means of the riding platform to the front wheel assembly.

FIG. 2 shows a detailed side profile view of one rotational engagement means 30 of the riding platform 16. Any conventional means for rotational engagement as would occur to those skilled in the art is however anticipated. A shaft 32 extending from the front end of the riding platform 16 engages coaxially with the collar 34 of the rotational engagement means 30.

Employed on the distal front end of the shaft 32 is an optional platform rotating mechanism 23. If provided, the rotating mechanism 23 provides a means to rotate the riding platform 16 by rotating the front wheel 20 using the handlebars thereby allowing user to rotate the front wheel and as the front wheel 20 rotates, it passes by and impacts the mechanism 23 thereby causing it to deflect and rotate. The rotation of the mechanism 23 in turn causes the shaft 32 to rotate which is engaged to the riding platform 16 which will rotate as well. Thus the rotating mechanism 23 provides the user a means to rotate the riding platform 16 by rotating the handlebars. Continuous rotations of the riding platform 16 are accomplished by continuous rotation of the front wheel assembly 18 by either rotating the steering column 22 about line BB or 'whipping' the rear wheel assembly 12 as described previously.

The collar 34 may also employ ball bearings (not shown) to ensure smooth rotation of the shaft 32 therein. Gusset 36 provides the final means to engage the rear and front assemblies. Also shown are clearance holes 38 through both collar 34 and shaft 32 that, when desired, may receive a locking pin (not shown) sized for a slidable engagement therein to lock the rear wheel assembly 12 in a rigid manner that does not permit rotation about axis AA for when conventional riding is desired.

Figure 3:
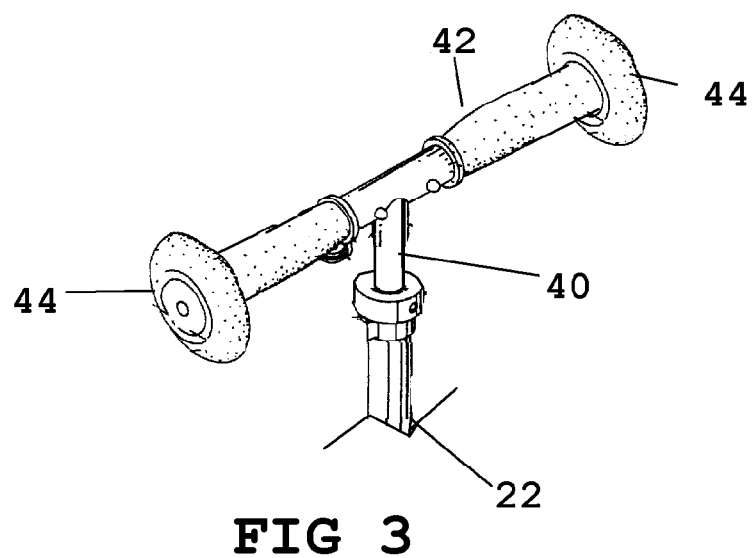
FIG. 3 is a perspective view of a particularly preferred mode of the top end of the steering assembly detailing two wheel assemblies engaged on the distal ends of the handlebars.

Seen in FIG. 3 is a particularly preferred mode of the top end 40 of the front wheel assembly 18. This mode shows wheels 44 rotationally engaged at both distal ends of the handlebars 42. This mode may be particularly desirable for greater stability when a user is stunt riding the device 10 as described earlier with the steering column 22 providing a temporary riding platform for the user's feet while the platform 16 is perpendicular to the ground.

It must be noted however that this mode of the device 10 in FIG. 3, may also be used in combination with the wheel 28 depicted in the preferred embodiment of the top end 24 shown in FIG. 1, where instead three wheels 28 and 44, will be engaged to the handlebar assembly. A single wheel 28 as described in FIG. 1 could be employed for this maneuver of riding on the steering column 22 as a platform, but is only preferred due to simplicity while all embodiment described herein achieve the same goal of allowing a user to employ the steering column 22 as a temporary platform for their feet while the riding platform 16 is not parallel with the ground or riding surface.

Figure 4:
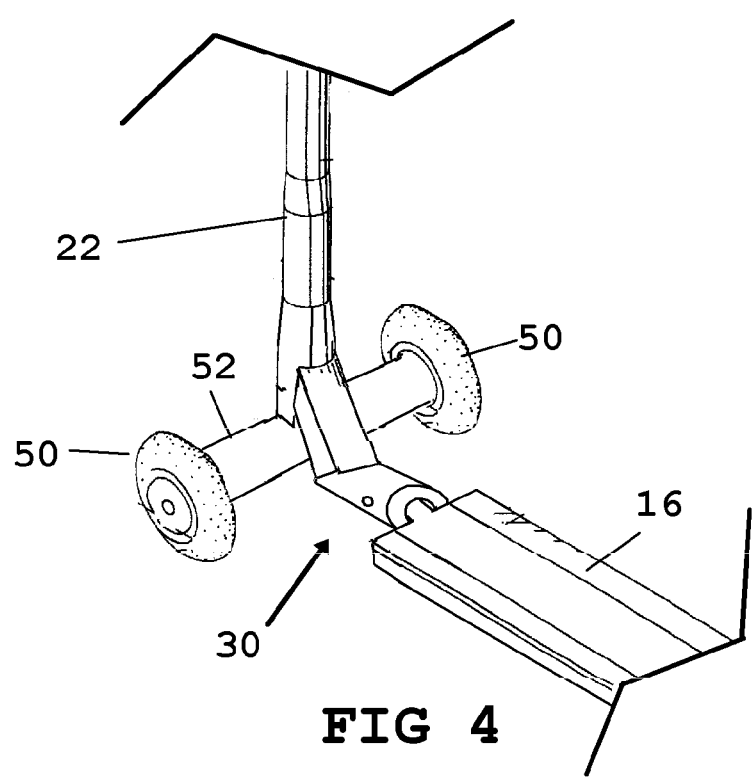
FIG. 4 shows a perspective view of a another particularly preferred mode of the front wheel assembly depicting two wheels engaged by a common axle with the bottom end of the steering assembly extending down to it.

FIG. 4 shows another particularly preferred mode of the front wheel assembly where now two wheels 50 are engaged by a common axle 52. As before, the bottom end of the steering column 22 extends downward to the front wheel assembly of wheels 50 rotationally engaged to the axle 52.

Figure 5:
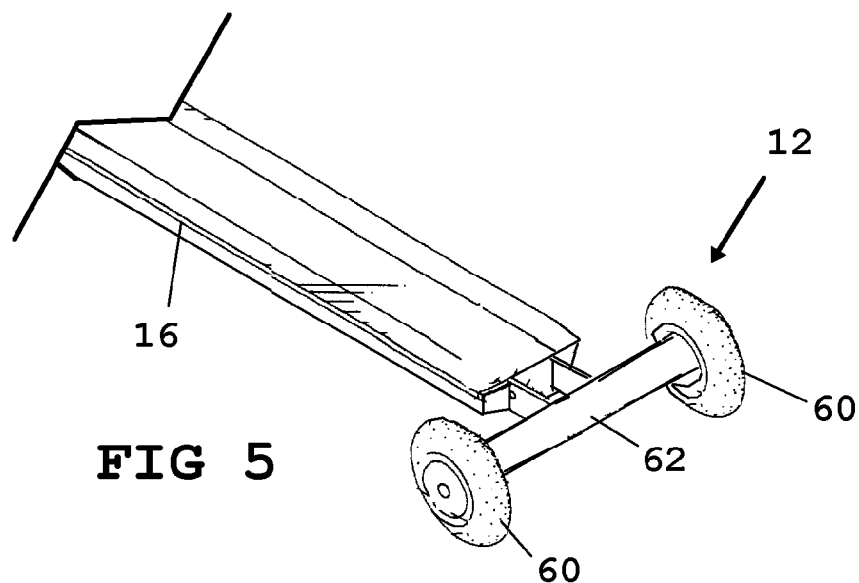
FIG. 5 is a perspective view of a particularly preferred mode of the rear wheel assembly depicting two wheels engaged by a common axle extending from the rear end of the riding platform.

Similarly, FIG. 5 shows another particularly preferred mode of the device 10, having a rear wheel assembly 12 in which again two wheels 60 are engaged by a common axle 62 as opposed to a single inline wheel 14 as described previously in FIG. 1. This mode of the device 10 if so configured, aids in providing added stability and support for the rider when in use while still permitting the same maneuvers and stunts to be performed as previously described. It must be noted however that any combination of single in-line wheel and two wheel configuration may be employed on the device but have been shown separately merely for simply descriptive purposes. For example, the rear wheel assembly may employ a two wheel configuration while the front wheel assembly employs a single in-line wheel or vis versa.

Figure 6:
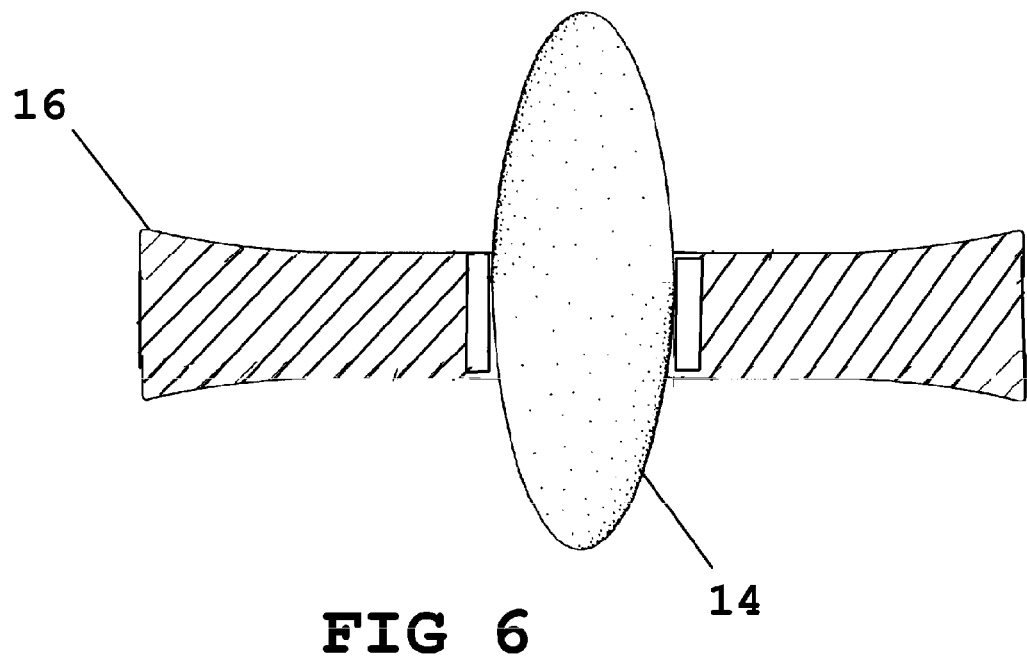
FIG. 6 is a rear view of the device showing the clearance given on the riding platform by the rear wheel assembly allowing a user to ride on with surface of the riding platform.

FIG. 6 shows a rear view of the device showing the relative clearance given on both the top and bottom surface of the riding platform 16 by the diameter of a rear wheel 14. This aspect is of great importance to the scope of employment of the device 10 as it allows a user to ride either side of the riding platform 16 and aids in the performance of extreme stunt maneuvers. Such clearance must also be considered for the two wheel configuration described in FIG. 5.

Figure 7:
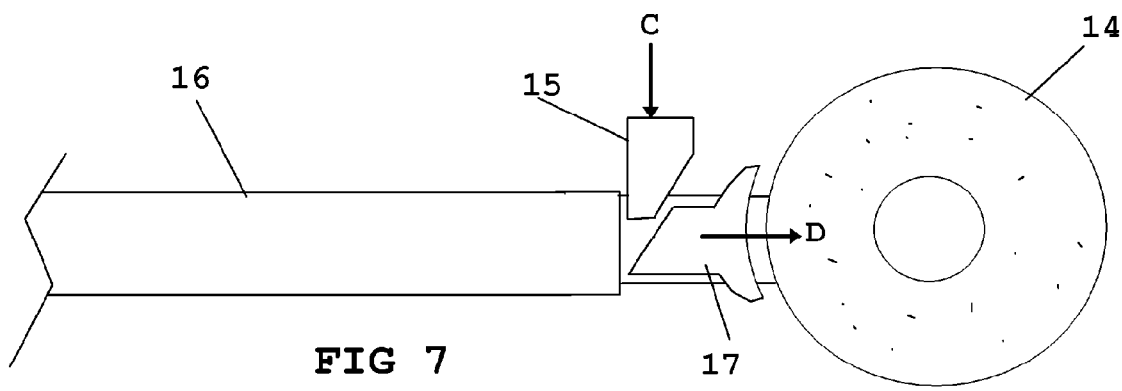
FIG. 7 is a cross-sectional view of the rear portion of the device from line 7-7 from FIG. 1 depicting the optional breaking mechanism.

FIG. 7 shows a cross sectional view of the rear wheel assembly 12 of the device as seen through line 7-7 from FIG. 1. The brake actuating portion 15 remains protruding from above the top surface of the riding platform 16. As a user applies pressure in direction "C" the direction and force is transferred to friction mechanism 17 that frictionally engages with the rear wheel 14 along direction "D". This provides a user with a means to brake the device 10 when going too fast or for tricks.

Figure 8:
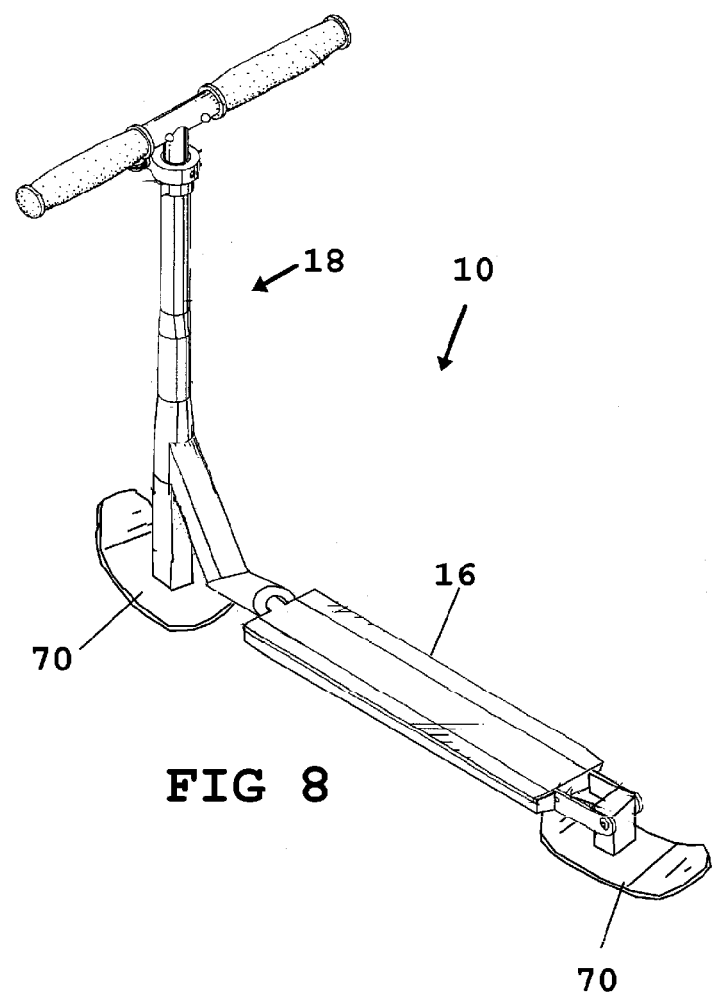
FIG. 8 is a perspective view of another particularly preferred mode of the device with skis or similar hydroplaning sleds on the front and rear wheel assemblies.

A further particularly preferred mode of the device can be seen in FIG. 8. In this mode the front and rear wheels on the support assemblies are replaced by ski-like skids 70, or other similar hydroplaning or sliding platforms. This mode allows the device 10, along with many of the extreme performance maneuvers, to be performed on snow, ice, or water as when accompanied by a towing water vessel.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A skate board assembly comprising:

a riding platform;

said riding platform having a rear wheel assembly attached thereto, said rear wheel assembly having a rear wheel rotationally engaged thereon;

said riding platform rotationally engaged to a front wheel assembly, at an end opposite said rear wheel assembly, said front wheel assembly having a front wheel rotationally engaged thereon;

said riding platform rotationally engaged to a front wheel assembly by a shaft extending from said riding platform through a first end of a collar engaged to said front wheel assembly;

a member engaged to said shaft at a first end;

said member having a second end opposite said first end;

said member rotatable by a rotation of said front wheel to thereby cause a communication of said front wheel with said second end of said member;

said communication causing a rotation of said member and concurrently said riding platform of said skate board;

a steering column having an upper end and having a lower end attached to the front wheel assembly to move therewith; and said riding platform being rotatable by a rider balancing on said skateboard assembly in a stunt position wherein said rear wheel is elevated above a riding surface on which said front wheel is supported.

2. The skate board assembly of claim 1, additionally comprising:

said rear wheel assembly having a pair of wheels rotationally engaged thereon in a parallel engagement to each other.

3. A skate board assembly comprising:

a riding platform;

said riding platform having a rear wheel assembly attached thereto, said rear wheel assembly having a rear wheel rotationally engaged thereon;

said riding platform rotationally engaged to a front wheel assembly, at an end opposite said rear wheel assembly, said front wheel assembly having a front wheel rotationally engaged thereon;

said riding platform rotationally engaged to a front wheel assembly by a shaft extending from said riding platform through a first end of a collar engaged to said front wheel assembly;

a member engaged to said shaft at a first end;

said member having a second end opposite said first end;

said member rotatable by a rotation of said front wheel to thereby cause a communication of said front wheel with said second end of said member; and said communication causing a rotation of said member and concurrently said riding platform of said skate board;

a steering column having an upper end and having a lower end attached to the front wheel assembly to move therewith;

a secondary wheel rotationally engaged adjacent to said upper end of said steering column;

said skate board positionable to a secondary riding position wherein said steering column is substantially parallel to said riding surface and supported thereon by said front wheel and said secondary wheel; and said riding platform being rotatable by a rider balancing on said skateboard assembly in a stunt position wherein said rear wheel is elevated above a riding surface on which said front wheel is supported.

4. The skate board assembly of claim 3, additionally comprising:
said rear wheel assembly having a pair of wheels rotationally engaged thereon in a parallel engagement to each other.

5. A skate board assembly comprising:
a riding platform;
said riding platform having a rear wheel assembly attached thereto, said rear wheel assembly having a rear wheel rotationally engaged thereon;
said riding platform rotationally engaged to a front wheel assembly, at an end opposite said rear wheel assembly, said front wheel assembly having a front wheel rotationally engaged thereon;
a steering column having an upper end and having a lower end attached to the front wheel assembly to move therewith; and
said riding platform being rotatable by a rider balancing on said skateboard assembly in a stunt position wherein said rear wheel is elevated above a riding surface on which said front wheel is supported
a pair of secondary wheels rotationally engaged to distal ends of a handlebar engaged to said upper end of said steering column, said handlebar being substantially perpendicular to said steering column; and
said skate board positionable to a secondary riding position wherein said steering column is substantially parallel to said riding surface and supported thereon by said front wheel and said pair of secondary wheels
said riding platform rotationally engaged to a front wheel assembly by a shaft extending from said riding platform through a first end of a collar engaged to said front wheel assembly;
a member engaged to said shaft at a first end;
said member having a second end opposite said first end;
said member rotatable by a rotation of said front wheel to thereby cause a communication of said front wheel with said second end of said member; and said communication rotating said member and concurrently said riding platform of said skate board in said stunt position.

6. The skate board assembly of claim 5, additionally comprising:
said rear wheel assembly having a pair of wheels rotationally engaged thereon in a parallel engagement to each other.

7. A riding board assembly comprising:
a riding platform;
said riding platform having a rear skid assembly attached thereto, said rear skid assembly having a rear skid operatively engaged thereto;
said riding platform rotationally engaged to a front skid assembly, at an end opposite said rear skid assembly, said front skid assembly having a front skid operatively engaged thereon;
said riding platform rotationally engaged to a front shaft assembly by a shaft extending from said riding platform through a first end of a collar engaged to said front skid assembly;
a member engaged to said shaft at a first end;
said member having a second end opposite said first end;
said member rotatable by a rotation of said front skid to thereby cause a communication of said front skid with said second end of said member; and
said communication causing a rotation of said member and concurrently said riding platform of said riding board;
a steering column having an upper end and having a lower end attached to the front skid assembly to move therewith; and
said riding platform being rotatable by a rider balancing on said riding board assembly in a stunt position wherein said rear skid is elevated above a riding surface on which said front skid is supported.

* * * * *